United States Patent
Choi

(10) Patent No.: US 10,467,340 B2
(45) Date of Patent: Nov. 5, 2019

(54) GRAMMAR CORRECTING METHOD AND APPARATUS

(71) Applicant: Samsung Electronics Co., Ltd., Suwon-si (KR)

(72) Inventor: Heeyoul Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 14/749,747

(22) Filed: Jun. 25, 2015

(65) Prior Publication Data
US 2016/0196257 A1    Jul. 7, 2016

(30) Foreign Application Priority Data
Jan. 2, 2015 (KR) .................. 10-2015-000166

(51) Int. Cl.
*G06F 17/27* (2006.01)
*G10L 15/19* (2013.01)

(52) U.S. Cl.
CPC .......... *G06F 17/274* (2013.01); *G10L 15/19* (2013.01)

(58) Field of Classification Search
CPC ....... G10L 15/00; G10L 15/08; G10L 15/063; G10L 15/22; G10L 15/265; G06F 17/274; G06F 17/30746; G06F 17/273
USPC ................. 704/201, 231, E15.001, 255, 251
See application file for complete search history.

(56) References Cited

U.S. PATENT DOCUMENTS

| 5,970,219 | A | * | 10/1999 | Nakamura | G06T 11/60 |
| | | | | | 358/1.15 |
| 6,006,175 | A | * | 12/1999 | Holzrichter | A61B 5/0507 |
| | | | | | 704/205 |
| 6,104,500 | A | * | 8/2000 | Alam | H04N 1/0036 |
| | | | | | 358/1.15 |
| 6,442,573 | B1 | * | 8/2002 | Schiller | H04L 29/06 |
| | | | | | 358/403 |
| 7,315,818 | B2 | | 1/2008 | Stevens et al. | |
| 7,853,874 | B2 | | 12/2010 | Schabes et al. | |
| 7,856,356 | B2 | | 12/2010 | Chung et al. | |
| 7,962,331 | B2 | | 6/2011 | Miller et al. | |
| 7,966,180 | B2 | | 6/2011 | Bajaj et al. | |
| 8,341,520 | B2 | | 12/2012 | Iakobashvili et al. | |
| 8,452,606 | B2 | | 5/2013 | Vos et al. | |
| 8,676,580 | B2 | | 3/2014 | Deshmukh et al. | |
| 8,831,947 | B2 | | 9/2014 | Wasserblat et al. | |
| 2002/0036791 | A1 | * | 3/2002 | Murphy | G06F 17/21 |
| | | | | | 358/1.15 |
| 2002/0138265 | A1 | * | 9/2002 | Stevens | G10L 15/22 |
| | | | | | 704/251 |
| 2004/0061890 | A1 | * | 4/2004 | Ferlitsch | G06F 3/1205 |
| | | | | | 358/1.15 |

(Continued)

FOREIGN PATENT DOCUMENTS

JP 2009-171360 A 7/2009
JP 4643911 B2 12/2010
(Continued)

*Primary Examiner* — Akwasi M Sarpong
(74) *Attorney, Agent, or Firm* — NSIP Law

(57) ABSTRACT

A grammar correcting method is provided, the method including receiving a sentence generated based on speech recognition, receiving information associated with a speech recognition result of the sentence and correcting grammar in the sentence based on the information associated with the speech recognition results of the sentence.

24 Claims, 9 Drawing Sheets

(56) References Cited

U.S. PATENT DOCUMENTS

| | | | |
|---|---|---|---|
| 2008/0077859 A1* | 3/2008 | Schabes | G06F 17/273 |
| | | | 715/257 |
| 2008/0201135 A1* | 8/2008 | Yano | G10L 15/1822 |
| | | | 704/201 |
| 2009/0070111 A1* | 3/2009 | Bajaj | G06F 17/274 |
| | | | 704/251 |
| 2009/0271189 A1* | 10/2009 | Agapi | G10L 15/01 |
| | | | 704/233 |
| 2010/0145680 A1* | 6/2010 | Yun | G10L 15/1815 |
| | | | 704/10 |
| 2010/0180198 A1* | 7/2010 | Iakobashvili | G06F 17/273 |
| | | | 715/257 |
| 2011/0313757 A1* | 12/2011 | Hoover | G06F 17/274 |
| | | | 704/9 |
| 2012/0095766 A1* | 4/2012 | Han | G10L 15/197 |
| | | | 704/255 |
| 2012/0203776 A1* | 8/2012 | Nissan | G06F 16/685 |
| | | | 707/728 |
| 2013/0179151 A1* | 7/2013 | Iverson | G06F 17/28 |
| | | | 704/9 |

FOREIGN PATENT DOCUMENTS

| | | |
|---|---|---|
| JP | 2011-529594 A | 12/2011 |
| JP | 2014-21494 A | 2/2014 |
| JP | 2014-115646 A | 6/2014 |
| KR | 10-0376032 B1 | 3/2003 |
| KR | 10-0725719 B1 | 6/2007 |
| KR | 10-1037247 B1 | 5/2011 |

\* cited by examiner

GRAMMAR CORRECTING METHOD AND APPARATUS

CROSS-REFERENCE TO RELATED APPLICATION(S)

This application claims the benefit under 35 USC 119(a) of Korean Patent Application No. 10-2015-0000166, filed on Jan. 2, 2015, in the Korean Intellectual Property Office, the entire disclosure of which is incorporated herein by reference for all purposes.

BACKGROUND

1. Field

The following description relates to a grammar correcting method and apparatus.

2. Description of Related Art

In general, a current speech recognition method utilized in a speech recognition system may not be technically perfect and may include a recognition error due to various factors such as noise. Accordingly, a grammatical error may be included in a text generated based on a speech recognition result.

The grammatical error included in the text generated based on the speech recognition result may be corrected by general techniques for correcting grammatical errors. However, since general techniques for correcting grammatical errors only perform corrections based on a given text, a speech recognition result may differ from an actual speech.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a grammar correcting method including receiving a sentence generated based on speech recognition, receiving information associated with a speech recognition result of the sentence, and correcting grammar in the sentence based on the information associated with the speech recognition result of the sentence.

The information associated with the speech recognition result of the sentence may include recognition reliabilities of words in the sentence. The information associated with the speech recognition result of the sentence may be determined based on at least one of a recognition reliability associated with a pronunciation of the sentence and a recognition reliability associated with an intention of the sentence. The information associated with the speech recognition result of the sentence may be determined based on at least one of a language model and an acoustic model for generating the sentence.

The correcting the grammar in the sentence may include detecting a plurality of candidate words associated with a grammatical error among words included in the sentence by verifying grammar in the sentence, selecting at least one candidate word among the plurality of candidate words based on the information associated with the speech recognition result of the sentence, and correcting the at least one selected candidate word.

The selecting the at least one candidate word may include selecting a candidate word having a lowest degree of recognition reliability among the plurality of candidate words. The plurality of candidate words are grammatically associated with each other.

The grammar correcting method may further include generating the sentence by recognizing a speech based on a language model and an acoustic model.

In another general aspect, there is provided a grammar correcting apparatus including a verifier configured to verify grammar in a sentence corresponding to a speech recognition result, and a corrector configured to correct the grammar in the sentence based on recognition reliabilities of words in the sentence.

The verifier may be configured to detect a plurality of candidate words associated with a grammatical error among words included in the sentence. The plurality of candidate words may be grammatically associated with each other.

The corrector may be configured to select at least one candidate word among a plurality of candidate words associated with a grammatical error based on the recognition reliabilities of the words in the sentence, and correct the at least one selected candidate word. The corrector may be configured to select a candidate word having a lowest degree of recognition reliability among the plurality of candidate words.

The recognition reliabilities of the words in the sentence may be determined based on at least one of a recognition reliability associated with a pronunciation of the sentence and a recognition reliability associated with an intention of the sentence. The recognition reliabilities of the words in the sentence may be determined based on at least one of a language model and an acoustic model for generating the sentence based on speech recognition.

The grammar correcting apparatus may further include a speech recognizer configured to recognize a speech based on a language model and an acoustic model.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Example embodiments to be described hereinafter may be applicable to a speech recognition method and used for various devices and apparatuses such as smartphones, tablet computers, wearable devices, smart appliances, personal computers, laptop computers, medical apparatuses, intelligent vehicle control devices, kiosks and other computing devices to which such a speech recognition method is applied.

Figure 1:
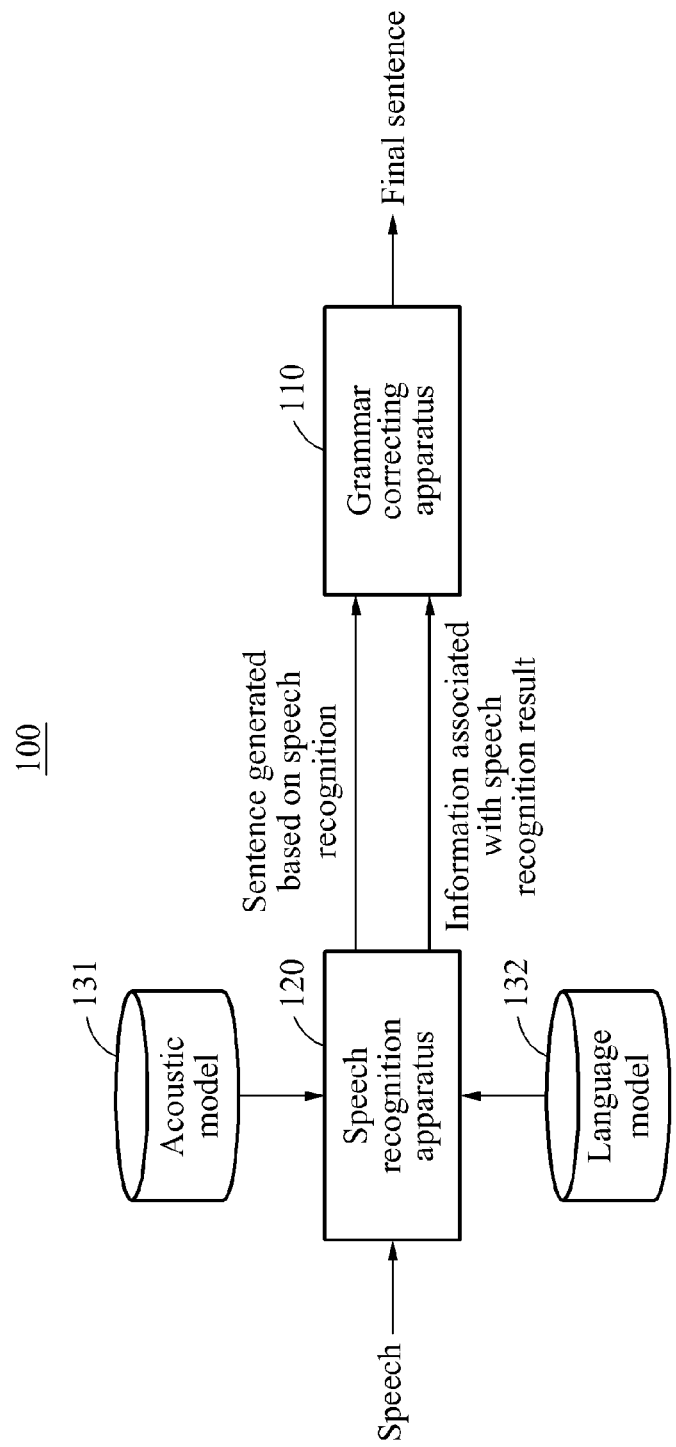
FIG. 1 is a diagram illustrating an example of a grammar correcting system.

FIG. 1 is a diagram illustrating an example of a grammar correcting system. Referring to FIG. 1, a grammar correcting system 100 includes a speech recognition apparatus 120 and a grammar correcting apparatus 110. The speech recognition apparatus 120 is an apparatus for recognizing speech. In accordance with one configuration, the speech recognition apparatus 120 may recognize a speech of a user using an acoustic model 131 and a language model 132 but is not limited thereto and thus the speech recognition apparatus 120 may include additional models. The speech recognition apparatus 120 may generate a sentence corresponding to a speech recognition result. Hereinafter, a speech of a user may be referred to as a speech or an actual speech.

In accordance with one configuration, the grammar correcting apparatus 110 is an apparatus for correcting grammar in a sentence generated based on speech recognition. Hereinafter, the sentence generated based on speech recognition may be referred to as a speech recognized sentence. The grammar correcting apparatus 110 may be provided in a form of a software module, a hardware module, or various combinations thereof.

The grammar correcting apparatus 110 may receive a speech recognized sentence according to various methods. For example, the grammar correcting apparatus 110 may be connected to the speech recognition apparatus 120 wirelessly or through a wire or a combination thereof, and receive a speech recognized sentence directly from the speech recognition apparatus 120. Alternatively, the grammar correcting apparatus 110 may receive a speech recognized sentence via a network, for example, the Internet. The speech recognized sentence may be stored in a server of a network, and the grammar correcting apparatus 110 may receive the speech recognized sentence from the server. Alternatively, the grammar correcting apparatus 110 may receive the speech recognized sentence from various external devices, for example a universal serial bus (USB), a mobile terminal, and the like.

In accordance with one configuration, the grammar correcting apparatus 110 corrects the speech recognized sentence based on information associated with a speech recognition result. The information associated with the speech recognition result may include information indicating a degree to which a speech recognized sentence corresponds to an actual speech. For example, information associated with a speech recognition result may indicate a predicted degree to which a speech recognized sentence corresponds to an actual speech.

The information associated with the speech recognition result is generated by the speech recognition apparatus 120. For example, in one configuration, the speech recognition apparatus 120 generates information associated with a speech recognition result by performing a decoding operation for the speech recognition. Hereinafter, detailed descriptions of the speech recognition apparatus 120 will be described.

The grammar correcting apparatus 110 receives the information associated with the speech recognition result according to various methods. For example, the grammar correcting apparatus 110 receives information associated with a speech recognition result based on an identical method applied to the method of receiving the speech recognized sentence. Alternatively, the grammar correcting apparatus 110 receives the information associated with the speech recognition result based on a method different from the method of receiving the speech recognized sentence.

According to one example, the grammar correcting apparatus 110 detects a grammatical error of a speech recognized sentence by verifying grammar in the speech recognized sentence. For example, the grammar correcting apparatus 110 may detect a grammatical error of a speech recognized sentence based on syntax and/or morphology corresponding to a language of the speech recognized sentence. Morphology is a rule of creating a word by combining morphemes in a predetermined language, and syntax is a rule of creating a sentence by combining words in a predetermined language.

The grammar correcting apparatus 110 corrects the grammatical error based on the information associated with the speech recognition result. The grammar correcting apparatus 110 generates a final sentence by correcting grammar in the speech recognized sentence. Similarly, the grammar correcting apparatus 110 provides a technology for correcting grammar in a speech recognized sentence based on information generated in a speech recognition process. Accordingly, a degree in which the final sentence corresponds to an actual speech may be increased. Hereinafter, a detailed operation of the grammar correcting apparatus 110 will be described.

Figure 2:
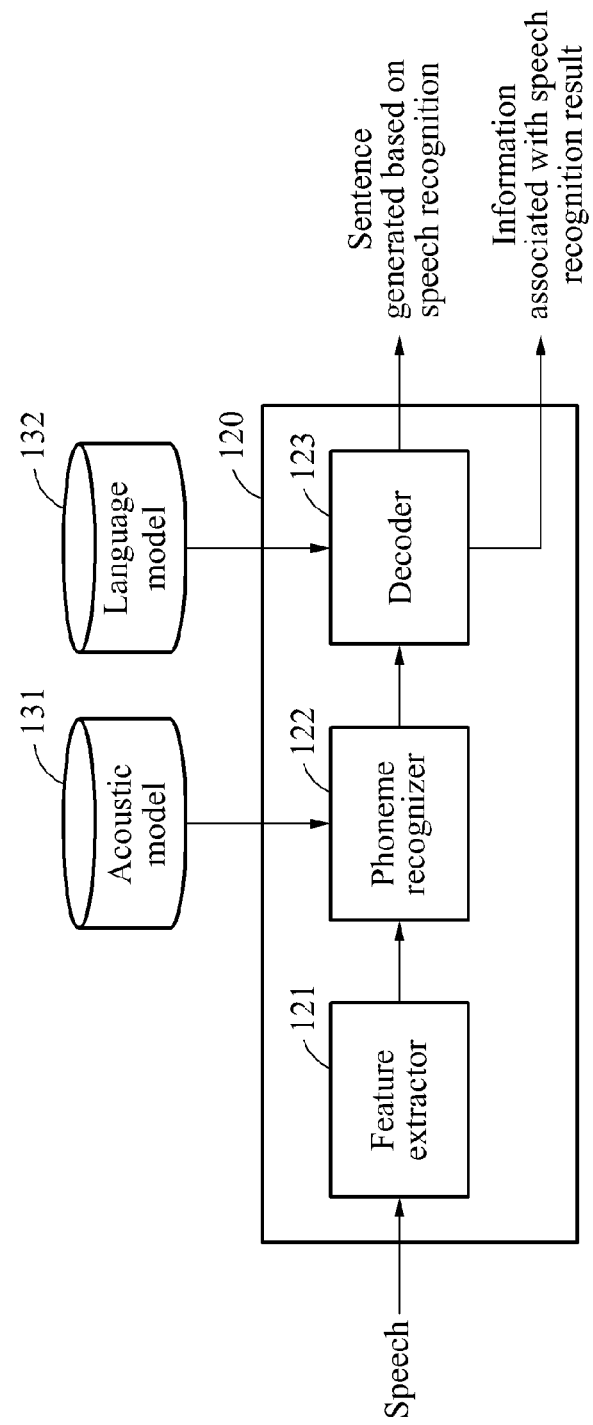
FIG. 2 is a diagram illustrating an example of a speech recognition apparatus.

FIG. 2 is a diagram illustrating an example of a speech recognition apparatus. Referring to FIG. 2, the speech recognition apparatus 120 includes a feature extractor 121, a phoneme recognizer 122, and a decoder 123. Although FIG. 2 illustrates the feature extractor 121, the phoneme recognizer 122, and the decoder 123 included in the speech recognition apparatus 120, these components may be embodied independently. Therefore, the speech recognition apparatus 120 illustrated in FIG. 2 is not limited thereto and thus may include more or less components. The feature extractor 121, the phoneme recognizer 122, and the decoder 123 may be provided in a form of a software module, hardware module, or various combinations thereof.

The feature extractor 121 extracts features from a speech. For example, in one configuration, the feature extractor 121 extracts the features from the speech using a local configuration pattern (LCP) technique, a mel frequency cepstral coefficient (MFCC) technique, and the like.

The phoneme recognizer 122 recognizes phonemes from the features using the acoustic model 131. A phoneme is a smallest sound unit to distinguish an intention of speech in a language system. The acoustic model 131 includes a dynamic time warping (DTW) based acoustic model, a hidden Markov model (HMM) based acoustic model, and the like. In an example, the phoneme recognizer 122 provides, based on the features, information associated with various phoneme candidates and recognition reliabilities of the various phoneme candidates with the decoder 123. A recognition reliability is a degree of convincing of a recognition. Information associated with the recognition reliability may be provided in various forms, such as a probability, a score, and the like.

The decoder 123 generates the speech recognized sentence based on the acoustic model 131 and the language model 132. The decoder 123 generates the speech recognized sentence such that a pronunciation of the actual speech corresponds to a pronunciation of the speech recognized sentence. In an example, the decoder 123 receives information associated with various phoneme candidates and recognition reliabilities of the corresponding candidates and generates words for generating a speech recognized sentence by selecting appropriate phoneme candidates based on the information associated with the recognition reliabilities of the candidates.

The decoder 123 generates, based on the language model 132, a speech recognized sentence of which an intention is semantically appropriate. The language model 132 may include an n-gram language model, a bidirectional recurrent neural network language model, and the like. In an example, the decoder 123 generates a speech recognized sentence by appropriately combining, based on the language model 132, words generated based on the acoustic model 131.

The decoder 123 outputs the information associated with the speech recognition result. The information associated with the speech recognition result may include recognition reliabilities of words included in the speech recognized sentence. The recognition reliabilities may be provided in various forms of probability, a score, and the like.

For example, a recognition reliability of each word included in a speech recognized sentence may indicate a degree to which a corresponding word corresponds to an actual speech. In this case, in response to a high recognition reliability of a predetermined word, the degree in which the corresponding word corresponds to the actual speech may be increased.

Alternatively, a recognition reliability of each word included in a speech recognized sentence indicates a degree in which an intention of a corresponding word is appropriate in a sentence. In this case, in response to a high recognition reliability of a predetermined word, the degree to which the corresponding word is appropriate in the sentence is increased.

As another alternative, a recognition reliability of each word included in a speech recognized sentence may synthetically indicate a degree to which a corresponding word corresponds to an actual speech and a degree to which a corresponding word is appropriate in the sentence. In this case, in response to a high recognition reliability of a predetermined word, the degree in which the corresponding word corresponds to the actual speech and the degree in which the corresponding word is appropriate in the sentence.

The information associated with the speech recognition result may be determined based on a recognition reliability associated with a pronunciation of a speech recognized sentence (hereinafter referred to as a pronunciation-related recognition reliability) and/or a recognition reliability associated with an intention of a speech recognized sentence (hereinafter referred to as an intention-related recognition reliability). The pronunciation-related recognition reliability of the speech recognized sentence indicates a degree to which a corresponding word corresponds to an actual speech and the intention-related recognition reliability of the speech recognized sentence indicates a degree to which a corresponding word is appropriate in a sentence.

The information associated with the speech recognition result may be determined based on the acoustic model 131 and/or the language model 132. For example, the intention-related recognition reliability of the speech recognized sentence may be determined based on the language model 132.

Figure 3:
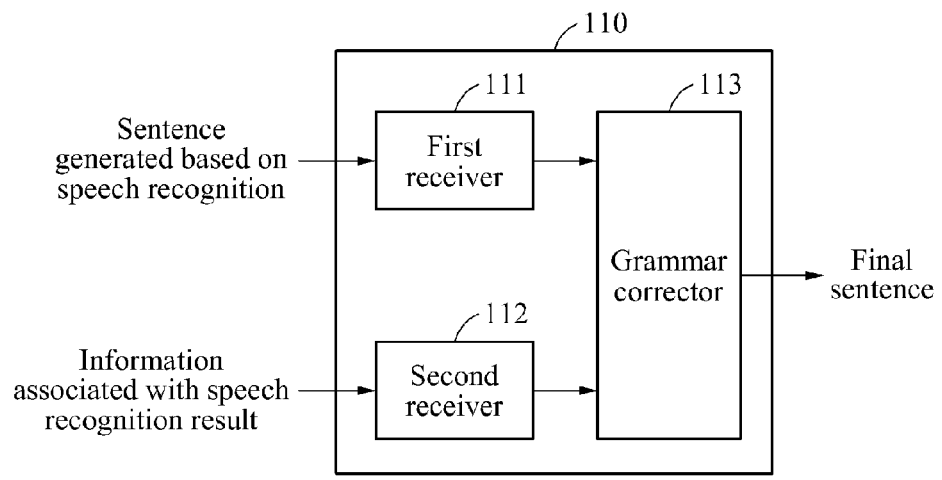
FIGS. 3 and 4 are diagrams illustrating examples of a grammar correcting apparatus.
Figure 4:
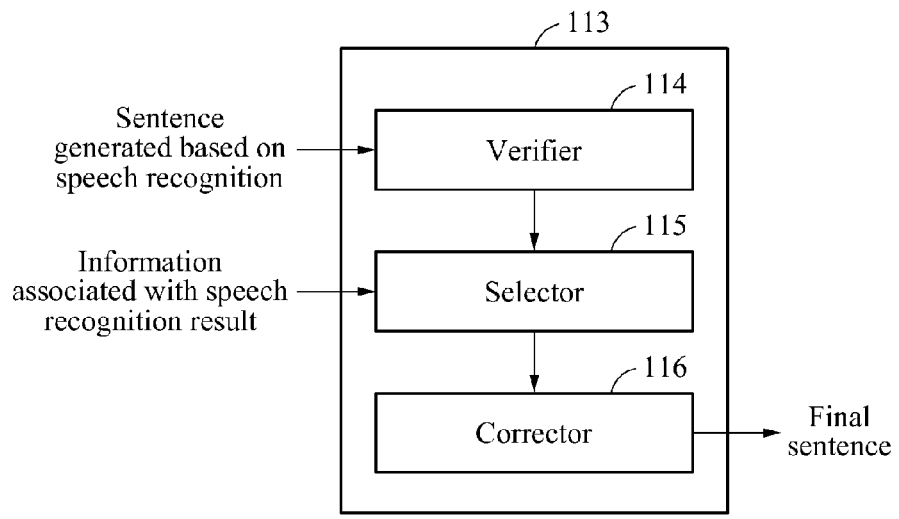

FIGS. 3 and 4 are diagrams illustrating examples of a grammar correcting apparatus. Referring to FIG. 3, the grammar correcting apparatus 110 includes a first receiver 111, a second receiver 112, and a grammar corrector 113. The first receiver 111, the second receiver 112, and the grammar corrector 113 may be provided in a form of a software module, a hardware module, or various combinations thereof. Additionally, although FIG. 3 illustrates the first receiver 111, the second receiver 112 and the grammar corrector 113 included in the grammar correcting apparatus 110, these components, for example, the grammar corrector 113, may be embodied as further independent components, or two or more of the components, for example, the first receiver 111 and the second receiver 112, may be combined in another implementation. Therefore, the grammar correction apparatus 110 illustrated in FIG. 3 is not limited thereto and thus may include more or less components.

The first receiver 111 receives a speech recognized sentence and the second receiver 112 receives information associated with a speech recognition result. The grammar corrector 113 corrects grammar in the speech recognized sentence based on the information associated with the speech recognition result.

Referring to FIG. 4, the grammar corrector 113 includes a verifier 114, a selector 115, and a corrector 116. The grammar corrector 113, the verifier 114, the selector 115, and the corrector 116 may be provided in a form of a software module, a hardware module, or various combinations thereof. Additionally, although FIG. 4 illustrates the verifier 114, the selector 115, and the corrector 116 included in the grammar corrector 113, these components may be embodied as independent components. Therefore, the grammar corrector 113 illustrated in FIG. 4 is not limited thereto and thus may include more or less components.

In accordance with one configuration, the verifier 114 detects a plurality of candidate words associated with a grammatical error among words included in a speech recognized sentence by verifying grammar in the speech recognized sentence. The plurality of candidate words are grammatically associated with each other. For example, a grammatical error in which a singular noun and a plural verb are associated with each other may exist in a speech recognized sentence. In this case, the verifier 114 may detect the singular noun and the plural verb based on the plurality of candidate words associated with the grammatical error.

In accordance with one configuration, the selector 115 selects at least one candidate word among the plurality of candidate words based on information associated with a speech recognition result. The verifier 115 may select a candidate word having a lowest degree of recognition reliability among the plurality of candidate words.

For example, the selector 115 may select a candidate word having a lowest degree of correspondence to an actual speech among the plurality of candidate words. Alternatively, the selector 115 may select a candidate word having a lowest degree of appropriateness in relation to an intention in a sentence among the plurality of candidate words. As another alternative, the selector 115 may select a candidate word having the synthetically lowest degree of the correspondence to the actual speech and the appropriateness in relation to the intention in the sentence.

For example, when a singular noun and a plural verb are detected by the verifier 114, the selector 115 may compare a recognition reliability of the singular noun and a recognition reliability of the plural verb. The selector 115 may select a candidate word having a relatively low recognition reliability between the singular noun and the plural verb.

In accordance with one configuration, the corrector 116 may correct at least one candidate word selected by the selector 115. For example, the corrector 116 may correct at least one selected candidate word based on syntax and/or morphology corresponding to a language of the speech recognized sentence.

For example, when a singular noun is selected by the selector 115, the corrector 116 may correct the singular noun to a plural verb. Alternatively, when a plural verb is selected by the selector 115, the corrector may correct the plural verb to a singular noun.

Since a candidate word selected by the selector 115 has a low recognition reliability, the corrector 116 may correct a candidate word having a low recognition reliability so that a grammatical error of a speech recognized sentence may be resolved.

Figure 5:
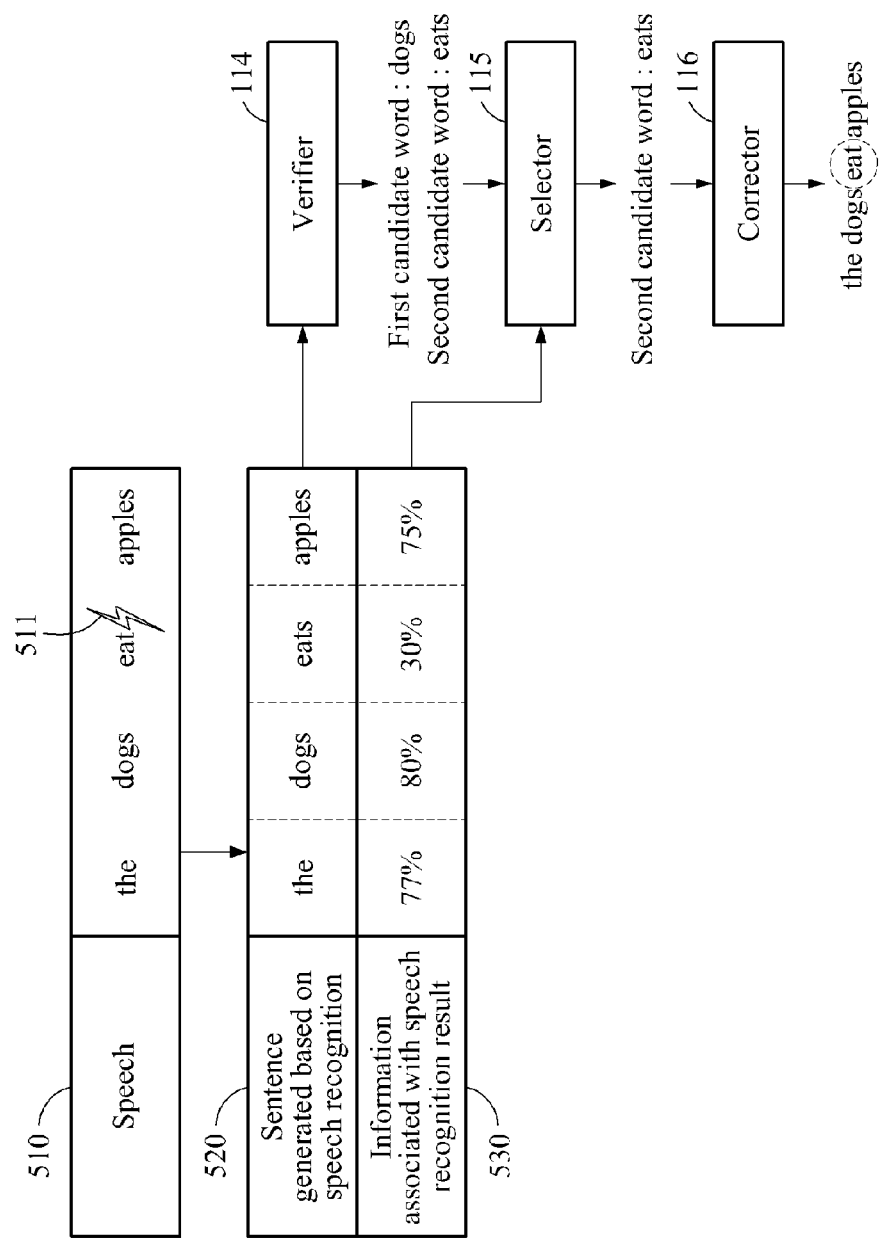
FIGS. 5, 6A, 6B and 7 are diagrams illustrating examples of correcting grammar in a speech recognized sentence based on information associated with a speech recognition result.
Figure 6A:
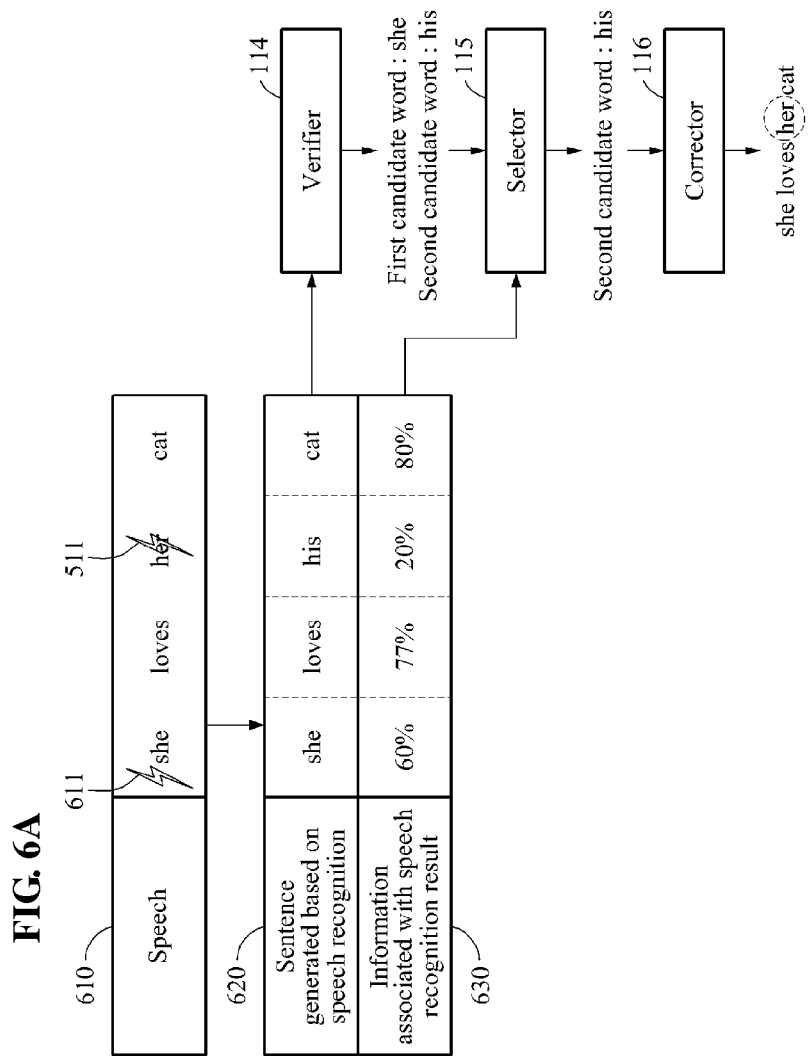
Figure 6B:
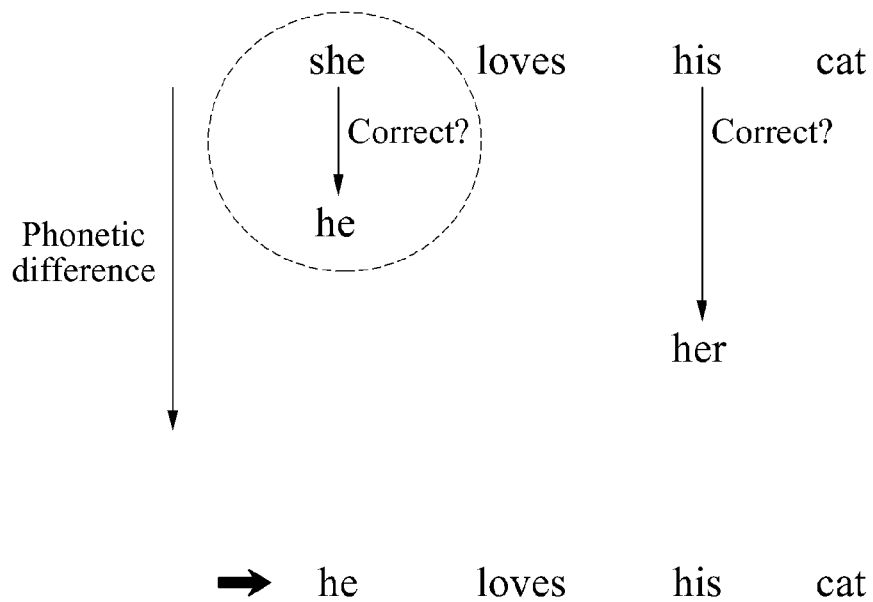
Figure 7:
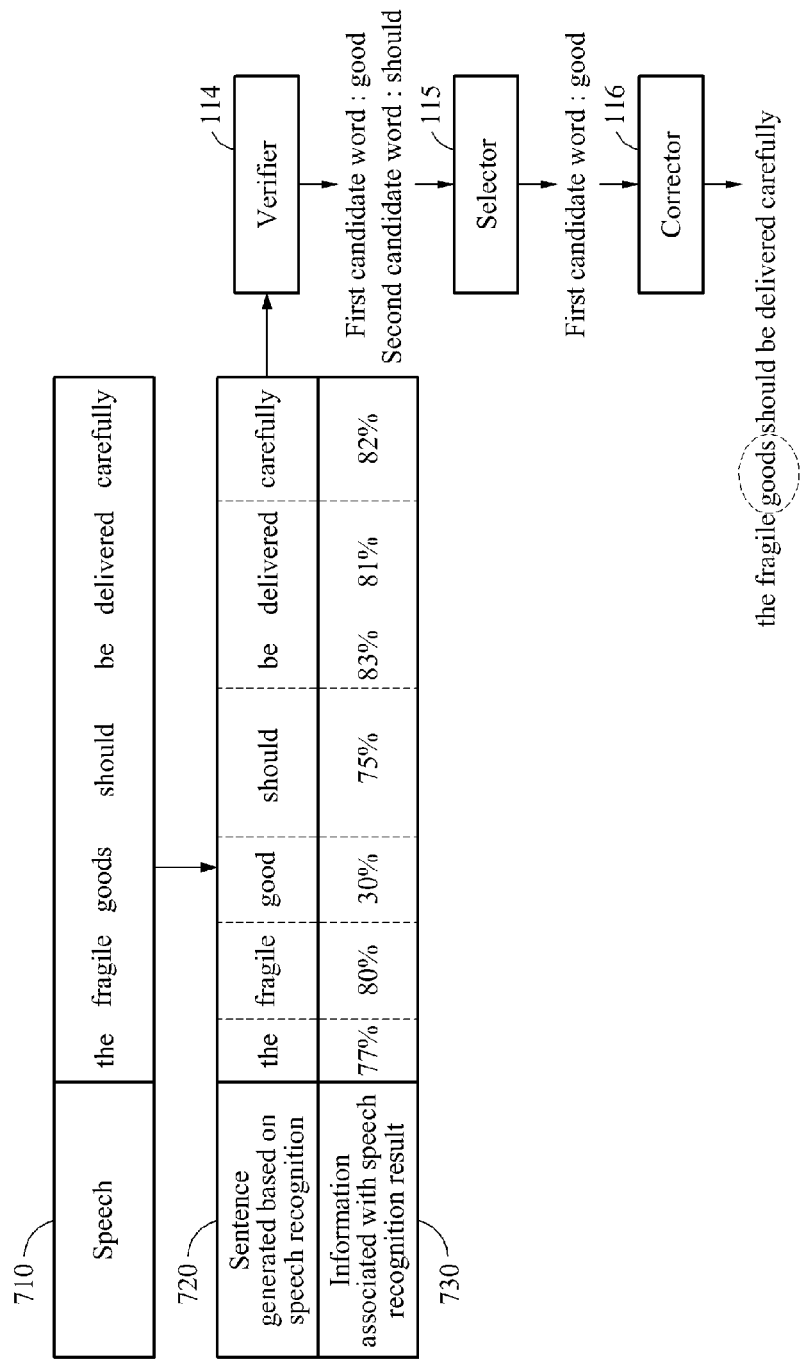

FIGS. 5 through 7 are diagrams illustrating examples of correcting grammar in a speech recognized sentence based on information associated with a speech recognition result. Referring to FIG. 5, an actual speech 510 may correspond to "the dogs eat apples." In this case, a recognition error may be generated due to various factors, for example, noise 511. For example, "eat" in the actual speech 510 may be recognized as "eats" due to the noise 511. In this case, a speech recognized sentence 520 may correspond to "the dogs eats apples."

Information 530 associated with a speech recognition result may include recognition reliabilities of each word included in the speech recognized sentence 520. Since the noise 511 occurs when "eats" in the speech recognized sentence 520 is recognized, a recognition reliability of "eats" may have a lower recognition reliability than of other words.

The verifier 114 may detect candidate words associated with a grammatical error by verifying grammar in the speech recognized sentence 520. For example, the verifier 114 may detect "dogs" as a first candidate word associated with a grammatical error and detect "eats" as a second candidate word associated with a grammatical error.

The selector 115 may select a target word required to be corrected among the candidate words based on the information 530 associated with the speech recognition result. For example, the selector 115 may compare a recognition reliability of "dogs" which is the first candidate word and a recognition reliability of "eats" which is the second candidate word. The recognition reliability of "dogs" which is the first candidate word corresponds to 80% and the recognition reliability of "eats" which is the second candidate word corresponds to 30%. Accordingly, the selector 115 may select "eats" which is the second candidate word as a target word required to be corrected.

The corrector 116 may correct a candidate word selected by the selector 115. For example, the corrector 116 may correct "eats" which is the second candidate word to "eat." The corrector 116 may output "the dogs eat apples" as a final sentence.

Referring to FIG. 6A, an actual speech 610 may correspond to "she loves her cat." In this case, a recognition error may be generated due to various factors, for example, noise 611 and the noise 511. For example, the noise 611 may correspond to relatively low noise, and the noise 511 may correspond to a relatively loud noise. In such an example, a recognition reliability of "she" in the actual speech 610 may be reduced due to the noise 611. In another example, "her" in the actual speech 610 may be recognized as "his" due to the noise 511. A speech recognized sentence 620 may correspond to "she loves his cat."

Information 630 associated with a speech recognition result may include recognition reliabilities of each word included in the speech recognized sentence 620. Since the noise 611 corresponding to relatively small noise occurs when "she" in the speech recognized sentence 620 is recognized, a recognition reliability of "eats" may have a lower recognition reliabilities than other words. Since the noise 611 corresponding to relatively small noise occurs when "his" in the speech recognized sentence 620 is recognized, a recognition reliability of "his" may have a lowest recognition reliability.

In accordance with one configuration, the verifier 114 may detect candidate words associated with a grammatical error by verifying grammar in the speech recognized sentence 620. For example, the verifier 114 may detect "she" as a first candidate word associated with a grammatical error and detect "his" as a second candidate word associated with a grammatical error.

According to a general technique of correcting a grammatical error, a result different from an actual speech may be brought due to a grammar correction. For example, referring to FIG. 6B, a method of correcting a grammatical error of "she loves his cat" includes two methods. A first method is a method of correcting "she" to "he." A second method is a method of correcting "his" to "her."

According to a general technique of correcting a grammatical error, based on a pronunciation difference between a word prior to correcting and a word subsequent to correcting, a method of correcting a grammatical error may be determined. For example, since a pronunciation difference between "she" and "he" is larger than a pronunciation difference between "his" and "her", a method of correcting "she" to "he" may be selected. In such an example, "she loves his cat" may be corrected to "he loves his cat."

Referring back to FIG. 6A, the selector 115 may select a target word to be corrected among candidate words based on the information 630 associated with the speech recognition result. For example, the selector 115 may compare a recognition reliability of "she" which is a first candidate word and a recognition reliability of "his" which is a second candidate word. The recognition reliability of "she" which is the first candidate word corresponds to 60% and the recognition reliability of "his" which is the second candidate word corresponds to 20%. Accordingly, the selector 115 may select "his" which is the second candidate word as a target word required to be corrected.

The corrector 116 may correct a candidate word selected by the selector 115. For example, the corrector 116 may correct "his" which is the second candidate word to "her." The corrector 116 may output "she loves her cat" as a final sentence.

Referring to FIG. 7, an actual speech 710 may correspond to "the fragile goods should be delivered carefully." In such an example, a recognition error may be generated due to various factors. For example, "should" is consecutively pronounced after "goods" in the actual speech 710 and "goods" in the actual speech 710 may be recognized as "good." In such an example, a speech recognized sentence 720 may correspond to "the fragile good should be delivered carefully."

Information 730 associated with a speech recognition result may include recognition reliabilities of each word included in the speech recognized sentence 720. Although "goods" in the actual speech 710 is recognized as "good", "good" in the speech recognized sentence 720 may have a less lowness in a pronunciation-related recognition reliability when compared to pronunciation-related recognition reliabilities of other words. Alternatively, the pronunciation-related recognition reliability of "good" in the speech recognized sentence 720 may have a more lowness in a pronunciation-related recognition reliability when compared to pronunciation-related recognition reliabilities of other words. Accordingly, "good" in the speech recognized sentence 720 may unnaturally have a lowest recognition reliability.

The verifier 114 may detect candidate words associated with a grammatical error by verifying grammar in the speech recognized sentence 720. For example, the verifier 11 may detect "good" as a first candidate word associated with a grammatical error and detect "need" as a second candidate word associated with a grammatical error.

The selector 115 may select a target word to be corrected among candidate words based on the information 730 associated with the speech recognition result. For example, the selector 115 may compare a recognition reliability of "good" which is a first candidate word and a recognition reliability of "should" which is a second candidate word. The recognition reliability of "good" which is the first candidate word corresponds to 30% and the recognition reliability of "should" which is the second candidate word corresponds to 75%. Accordingly, the selector 115 may select "good" which is the first candidate word as a target word required to be corrected.

The corrector 116 may correct a candidate word selected by the selector 115. For example, the corrector 116 may correct "good" which is the first candidate word to "goods." The corrector 116 may output "the fragile goods should be delivered carefully" as a final sentence.

Figure 8:
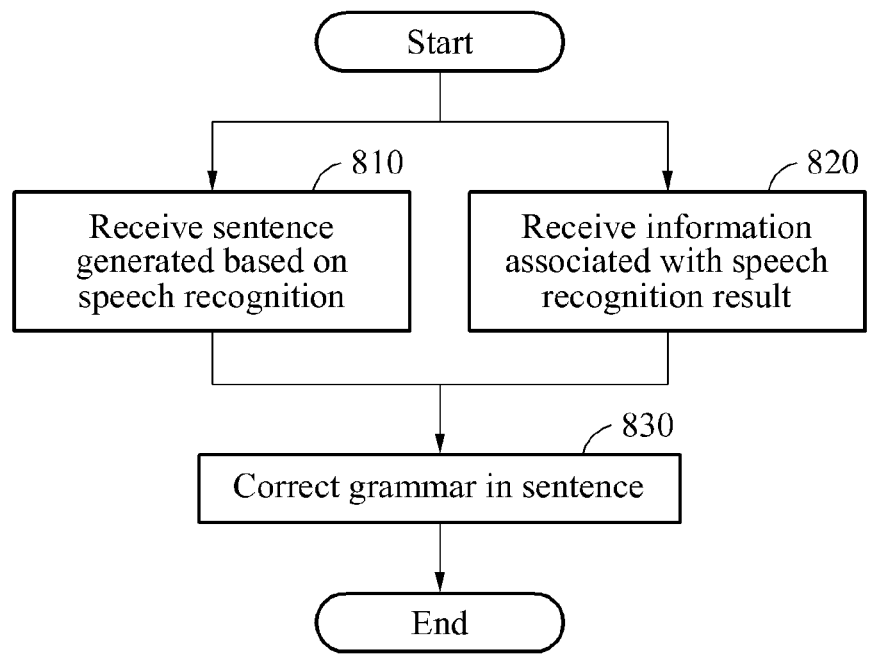
FIGS. 8 and 9 are flowcharts illustrating examples of a grammar correcting method.
Figure 9:
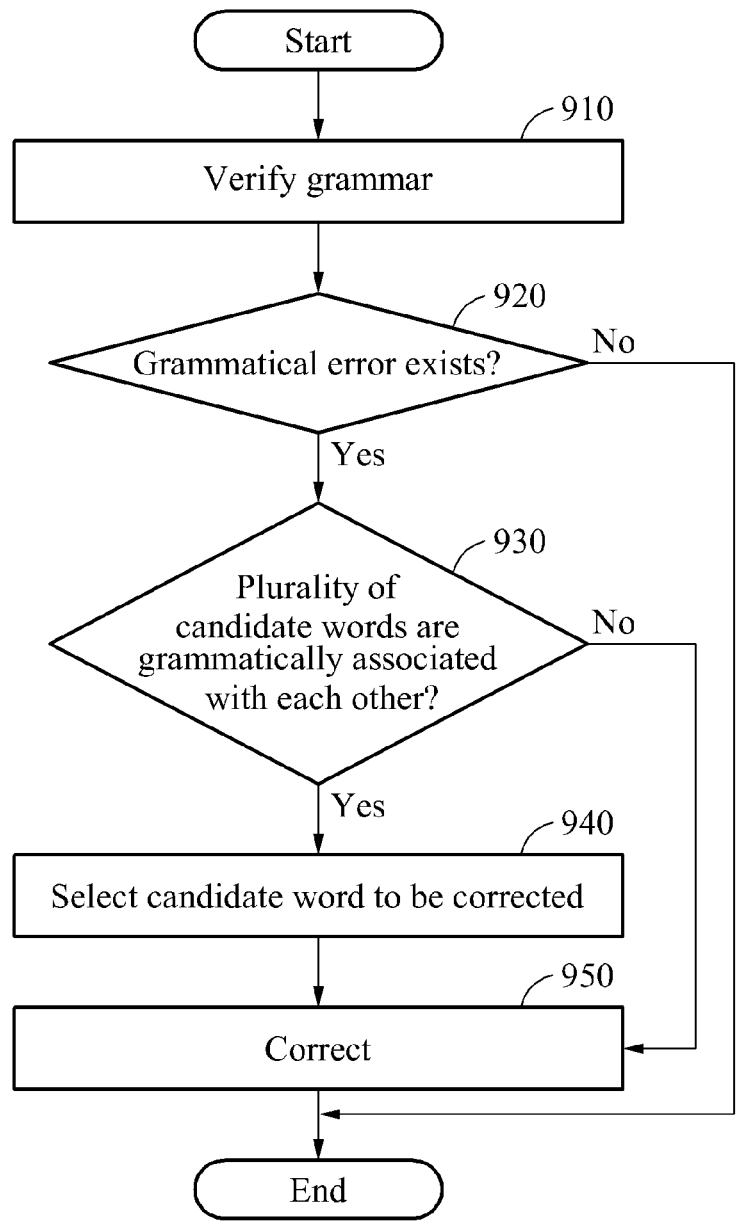

FIGS. 8 and 9 are flowcharts illustrating examples of a grammar correcting method. Referring to FIG. 8, the grammar correcting method includes operation 810 of receiving a sentence generated based on speech recognition, operation 820 of receiving information associated with a speech recognition result of a speech recognized sentence, and operation 830 of correcting grammar in the speech recognized sentence based on the information associated with the speech recognition result.

Referring to FIG. 9, operation 830 of correcting grammar in the speech recognized sentence based on the information associated with the speech recognition result includes operations 910 through 950. In operation 910, grammar in a speech recognized sentence is verified. In operation 920, based on a grammar verifying result, it is determined whether a grammatical error in the speech recognized sentence exists. If it is determined that a grammatical error does not exist, an operation is terminated without a correction being made.

If it is determined that a grammatical error exists, YES in operation 920, in operation 930, it is determined whether a plurality of candidate words are grammatically associated with each other. In response to a determination in which the plurality of candidate words are not grammatically associated with each other, a single word associated with the grammatical error is corrected. For example, when a sentence of "she love her cat" is recognized, a word associated with the grammatical error may be a single word of "love." In such an example, "love" is corrected to "loves."

In operation 940, in response to a determination in which the plurality of candidate words are grammatically associated with each other, a candidate word to be corrected is selected. In such an example, in operation 950, the selected candidate word is corrected. Repeated descriptions will be omitted for increased clarity and conciseness because the descriptions provided with reference to FIGS. 8 and 9 are also applicable to FIGS. 1 through 7.

The apparatuses, units, modules, devices, and other components illustrated in FIGS. 1-3 that perform the operations described herein with respect to FIGS. 4-9 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 4-9. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-9 that perform the operations described herein with respect to FIGS. 1-3 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, performed by one or more processors of a speech recognition system, the method comprising:
    generating a speech-recognized sentence based on speech recognition of a speech; generating information associated with a speech recognition result of the speech-recognized sentence;
    determining whether a grammatical error exists in the speech-recognized sentence, the grammatical error being associated with the speech recognition;
    identifying a plurality of candidate words, associated with the determined grammatical error, from among a plurality of words included in the speech-recognized sentence, each of the plurality of candidate words being grammatically associated with each other;
    in response to the grammatical error in the speech-recognized sentence being determined to be based on the plurality of candidate words, selecting a target word required to be corrected among the plurality of candidate words based on respective recognition reliabilities of the candidate words; and
    generating a final speech-recognized sentence of the speech by correcting the selected target word to correct the grammatical error of the speech-recognized sentence based on at least one remaining candidate word excluding the target word, among the plurality of candidate words,
    wherein the information associated with the speech recognition result of the speech-recognized sentence includes respective recognition reliabilities of each of words in the speech-recognized sentence, the respective recognition reliabilities being associated with the speech recognition, and
    wherein the information associated with the speech recognition result of words included in the speech-recognized sentence is determined based on at least one of a recognition reliability associated with a pronunciation of the speech-recognized sentence and a recognition reliability associated with an intention of the speech-recognized sentence.

2. The method of claim 1, wherein the recognition reliabilities of the words in the speech-recognized sentence comprise recognition reliabilities of parts of the words.

3. The method of claim 1, wherein the information associated with the speech recognition result of the speech-recognized sentence is dependent on at least one of recognition reliabilities from a language model and recognition reliabilities from an acoustic model.

4. The method of claim 1, wherein the correcting the grammar in the speech-recognized sentence further comprises:
    detecting the plurality of candidate words associated with the grammatical error among the words in the speech-recognized sentence by verifying grammar in the speech-recognized sentence;
    selecting at least one candidate word among the plurality of candidate words based on the respective recognition reliabilities of each of the words in the speech-recognized sentence included in the information associated with the speech recognition result of the speech-recognized sentence; and
    correcting the at least one selected candidate word.

5. The method of claim 4, wherein the selecting the at least one candidate word comprises selecting a candidate word having a lowest degree of recognition reliability among the plurality of candidate words.

6. The method of claim 1, further comprising:
    generating the speech-recognized sentence by recognizing the speech based on a language model and an acoustic model in the speech recognition; and
    providing the generated recognition reliabilities of the words in the speech-recognized sentence, for the correcting of the grammatical error in the speech-recognized sentence, dependent on respective recognition reliabilities from the language model and/or the acoustic model during the speech recognition.

7. The method of claim 1, wherein the speech-recognized sentence generated based on the speech recognition is a recognized sentence resulting from a decoder operation that considers results of an acoustic model and/or a language model.

8. The method of claim 7, wherein the recognition reliabilities of the words in the speech-recognized sentence are based on recognition reliabilities respectively determined by the acoustic model and/or the language model during the generation of the speech-recognized sentence in the speech recognition.

9. The method of claim 8, wherein
the recognition reliabilities determined by the acoustic model are recognition reliabilities associated with the pronunciation of the speech-recognized sentence and the recognition reliabilities determined by the language model are recognition reliabilities associated with the intention of the speech-recognized sentence, and
the recognition reliabilities of the words include the recognition reliabilities associated with the pronunciation of the speech-recognized sentence and the recognition reliabilities associated with the intention of the speech-recognized sentence.

10. A computer program combined with hardware and stored in a non-transitory computer-readable storage medium to cause the one or more processors of the speech recognition system to perform the method of claim 1.

11. A speech recognition system, the system comprising one or more processors configured to:
verify grammar in a speech-recognized sentence, generated based on speech recognition of a speech, for grammatical error correction;
determine whether grammatical errors of the sentence exist based on a plurality of candidate words, each of the plurality of candidate words being identified in the verification from words in the sentence and being grammatically associated with each other, and the grammatical errors being associated with the speech recognition;
in response to the grammatical errors in the speech-recognized sentence being determined to be based on the plurality of candidate words, select a target word required to be corrected among the plurality of candidate words based on respective recognition reliabilities of the candidate words, the respective recognition reliabilities being associated with the speech recognition; and
generate a final speech-recognized sentence of the speech by correcting the selected target word to correct the grammatical error of the sentence based on at least one remaining candidate word excluding the target word, among the plurality of candidate words,
wherein the information associated with the speech recognition result of words included in the speech-recognized sentence is determined based on at least one of a recognition reliability associated with a pronunciation of the speech-recognized sentence and a recognition reliability associated with an intention of the speech-recognized sentence.

12. The system of claim 11, wherein, for the verification, the one or more processors are further configured to detect the plurality of candidate words associated the grammatical errors among the words comprised in the speech-recognized sentence.

13. The system of claim 11, wherein the one or more processors are further configured to select at least one candidate word among the plurality of candidate words associated with the grammatical errors based on the recognition reliabilities of the words in the speech-recognized sentence, and correct the at least one selected candidate word.

14. The system of claim 13, wherein the one or more processors are further configured to select a candidate word having a lowest degree of recognition reliability among the plurality of candidate words.

15. The system of claim 11, wherein the recognition reliabilities of the words in the speech-recognized sentence are dependent on at least one of recognition reliabilities from a language model and recognition reliabilities from an acoustic model.

16. The system of claim 11, wherein
the one or more processors are further configured to:
perform a speech recognition operation of the speech based on a language model and an acoustic model to generate the speech-recognized sentence; and
provide the recognition reliabilities of the words in the speech-recognized sentence, for the correcting of the grammatical errors, dependent on respective recognition reliabilities from the language model and/or the acoustic model during the speech recognition operation.

17. The system of claim 11, wherein the speech-recognized sentence is a generated result of a speech recognition operation, with the generated result of the speech recognition operation being a recognized sentence resulting from a decoder operation that considers results of an acoustic model and/or a language model.

18. The system of claim 17, wherein the recognition reliabilities of the words in the speech-recognized sentence are based on recognition reliabilities respectively determined by the acoustic model and/or the language model during the generation of the speech-recognized sentence in the speech recognition operation.

19. The system of claim 18, wherein
the recognition reliabilities determined by the acoustic model are recognition reliabilities associated with the pronunciation of the speech-recognized sentence and the recognition reliabilities determined by the language model are recognition reliabilities associated with the intention of the speech-recognized sentence, and
the recognition reliabilities of the words include the recognition reliabilities associated with the pronunciation of the speech-recognized sentence and the recognition reliabilities associated with the intention of the speech-recognized sentence.

20. A speech recognition system, the system comprising:
one or more processors configured to:
generate a speech-recognized sentence based on speech recognition of a speech; generate information associated with a speech recognition result of the speech-recognized sentence;
determine whether a grammatical error exists in the speech-recognized sentence, the grammatical error being associated with the speech recognition;
identify a plurality of candidate words, associated with the determined grammatical error, from among a plurality of words included in the speech-recognized sentence, each of the plurality of candidate words being grammatically associated with each other;
in response to the grammatical error in the speech-recognized sentence being determined to be based on the plurality of candidate words, select a target word required to be corrected among the plurality of candidate words based on respective recognition reliabilities of the candidate words;

generating a final speech-recognized sentence of the speech by correcting the selected target word to correct the grammatical error of the speech-recognized sentence based on at least one remaining candidate word excluding the target word, among the plurality of candidate words, wherein the information associated with the speech recognition result of the speech-recognized sentence includes respective recognition reliabilities of each of the words in the speech-recognized sentence, the respective recognition reliabilities being associated with the speech recognition, and wherein the information associated with the speech recognition result of words included in the speech-recognized sentence is determined based on at least one of a recognition reliability associated with a pronunciation of the speech-recognized sentence and a recognition reliability associated with an intention of the speech-recognized sentence.

21. The system of claim 20, wherein the one or more processors are further configured to:

detect the plurality of candidate words associated with the grammatical error included in the speech-recognized sentence by verifying grammar in the speech-recognized sentence;

select at least one candidate word among the plurality of candidate words based on the respective recognition reliabilities of each of the words in the speech-recognized sentence included in the information associated with the speech recognition result; and correct the at least one selected candidate word.

22. The system of claim 20, wherein the speech-recognized sentence generated based on the speech recognition is a recognized sentence resulting from a decoder operation that considers results of an acoustic model and/or a language model.

23. The system of claim 22, wherein the recognition reliabilities of the words in the speech-recognized sentence are based on recognition reliabilities respectively determined by the acoustic model and/or the language model during the generation of the speech-recognized sentence in the speech recognition.

24. The system of claim 23, wherein the recognition reliabilities determined by the acoustic model are recognition reliabilities associated with the pronunciation of the speech-recognized sentence and the recognition reliabilities determined by the language model are recognition reliabilities associated with the intention of the speech-recognized sentence, and the recognition reliabilities of the words include the recognition reliabilities associated with the pronunciation of the speech-recognized sentence and the recognition reliabilities associated with the intention of the speech-recognized sentence.

* * * * *